UNITED STATES PATENT OFFICE.

ELIAS BIELOUSS, OF WASHINGTON, DISTRICT OF COLUMBIA, ASSIGNOR TO HENRY A. GARDNER, OF WASHINGTON, DISTRICT OF COLUMBIA.

PREPARATION OF DRYING OILS.

1,384,423.  Specification of Letters Patent.  Patented July 12, 1921.

No Drawing.  Application filed July 21, 1920.  Serial No. 397,872.

*To all whom it may concern:*

Be it known that I, ELIAS BIELOUSS, a citizen of the United States, residing at Washington, in the District of Columbia, have invented certain new and useful Improvements in the Preparation of Drying Oils, of which the following is a specification.

In a copending application Serial Number 343,458, Gardner and Bielouss, certain methods are described for the preparation of drying oils from chlorinated hydrocarbons, the formation of resinous or asphaltic residues being largely prevented by a proper control of the dechlorinating temperatures, which according to the said application are not permitted to exceed 250° C. As one means for controlling the temperature and otherwise facilitating the operation, the said application described the dechlorination of the hydrocarbon in presence of a non-chlorinated diluent, which may be a hydrocarbon or hydrocarbon mixture of the kerosene type. As described in the said application the dechlorination is preferably accelerated by the addition of certain extraneous substances, such for example as metal powders (iron, zinc, aluminum, etc.), or the like, which function as active catalysts.

My further researches have shown that it is possible, in carrying out the above described processes, to accomplish the dechlorination without the use of catalysts, and that thereby certain definite advantages are secured: especially there is decidedly less liability, even when operating at fairly high temperatures, to the resin-forming condensation; and furthermore somewhat lighter-colored dechlorinated products may be made. It appears that catalysts of the type mentioned in the prior application above referred to, in addition to performing their proper function of accelerating the splitting off of hydrochloric acid, are apt to induce certain side reactions which lead eventually to the formation of the objectionable reaction products above referred to as of a resinous character. By omitting the catalyst altogether, while at the same time avoiding excessive temperatures, that is to say temperatures materially exceeding 250° C., I have been able to secure a practically complete elimination of the combined chlorin (upward of 90% elimination) both with and without the use of non-chlorinated diluents, as well as by the use of diluents, such as soy oil and boiled linseed oil, which have a relatively very high boiling point and which, although miscible with the chlorinated and dechlorinated hydrocarbons, are not necessarily highly effective solvents for the resin-like reaction products.

In the practice of the present invention I may effect the dechlorination in glass or enamel-lined vessels or (by operating under anhydrous conditions) in iron apparatus, the walls of the latter having only limited catalytic effect, or possibly none at all, and therefore not constituting an active catalyst within the meaning of this specification.

Following are certain specific illustrative examples in accordance with the invention, it being well understood that the invention is not restricted to such specific conditions as are below set forth by way of example.

*Example I.*

A Pennsylvania crude oil, specific gravity 0.741, was topped to 200° C. The residue, specific gravity 0.831, was then chlorinated in absence of a catalyst until it had absorbed 52% by weight of chlorin, equivalent to about 34% combined chlorin in the product. This chlorinated product was held at 220–230° C. for 10 hours in a glass vessel, losing as hydrochloric acid upward of 92% of the combined chlorin. The residual product was a dark colored, rather viscous oil having a specific gravity of 0.961 and an iodin number of 145. Upon proper dilution by appropriate thinners (mineral spirits, benzene, solvent naphtha, turpentine, etc.) and the addition of 5–10% of lead-manganese linoleate solution in turpentine as a drier, the product yielded highly satisfactory protective films upon metal, wood, fabrics, etc., both with and without pigment additions.

*Example II.*

A Franklin crude oil, specific gravity 0.869, was chlorinated under conditions as above until it had absorbed 52% by weight of chlorin (equivalent to about 34% combined chlorin in the product), and was then dechlorinated in absence of any active catalyst by heating for 14 hours at 220–240° C., losing upward of 94% of its combined chlorin. The characteristics of the product were substantially as in Example I, the iodin number in this case being 122.

Example III.

Mineral spirits, specific gravity 0.815, was chlorinated as above, yielding a product containing approximately 34.5% of combined chlorin. Upon direct dechlorination at a temperature range of 190° to 205° C., in the absence of any diluent or active catalyst, a dark colored oil resulted of specific gravity 0.938 and an iodin number of 142, this oil on addition of drier, exhibiting satisfactory drying and film-forming qualities.

The dechlorinating operation may be carried out in presence of a non-chlorinated or volatilizable diluent, in which case the operation is preferably conducted under a reflux condenser and approximately at the boiling point of the diluent or one of its components, which in the preferred case of mineral spirits is 160–220° C. Or it may be carried out at a similar or somewhat higher temperature range in presence of a high boiling diluent, which may be of the glycerid type (soy oil, boiled linseed oil, etc.) or, as stated above, the dechlorinating operation may be carried out in absence of any diluent, the formation of resinous products of limited solubility being so far restricted by the proper limitation of the original chlorinating operation, by the proper choice of dechlorinating temperatures, and by the absence of active catalysts, that there is no substantial interference by such resinous products either with the conduct of the operation or with the subsequent recovery and use of the unsaturated oil.

As regards the limitation of the chlorinating operation it is my present preference when operating in accordance with this invention that the chlorinated product should contain combined chlorin not in excess of about 40% by weight.

I claim:—

1. A process of preparing drying oils from paraffin-type hydrocarbons, comprising effecting a limited chlorination of the oil, and thereafter dechlorinating the product at moderate temperatures and out of contact with an active catalyst, whereby excessive formation of objectionable by-products of reaction is avoided.

2. Process according to claim 1 wherein the chlorinated oil contains combined chlorin not in excess of 40% by weight.

In testimony whereof I affix my signature.

ELIAS BIELOUSS.